US010452635B2

(12) United States Patent
Arkhipova et al.

(10) Patent No.: US 10,452,635 B2
(45) Date of Patent: Oct. 22, 2019

(54) SYNCHRONIZING FILES ON DIFFERENT COMPUTING DEVICES USING FILE ANCHORS

(71) Applicant: Microsoft Technology Licensing, LLC, Redmond, WA (US)

(72) Inventors: Olga Arkhipova, Woodinville, WA (US); Bogdan I. Mihalcea, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 627 days.

(21) Appl. No.: 15/140,164

(22) Filed: Apr. 27, 2016

(65) Prior Publication Data

US 2017/0277742 A1    Sep. 28, 2017

Related U.S. Application Data

(60) Provisional application No. 62/312,201, filed on Mar. 23, 2016.

(51) Int. Cl.
*G06F 16/27* (2019.01)
*G06F 16/23* (2019.01)
*G06F 16/16* (2019.01)
*G06F 16/178* (2019.01)
*G06F 16/11* (2019.01)

(52) U.S. Cl.
CPC .......... *G06F 16/2322* (2019.01); *G06F 16/11* (2019.01); *G06F 16/16* (2019.01); *G06F 16/178* (2019.01); *G06F 16/27* (2019.01); *G06F 16/275* (2019.01)

(58) Field of Classification Search
None
See application file for complete search history.

(56) References Cited

U.S. PATENT DOCUMENTS

| 7,653,664 | B2 | 1/2010 | Chitre et al. |
|---|---|---|---|
| 7,752,166 | B2 | 7/2010 | Quinlan et al. |
| 7,778,971 | B2 | 8/2010 | Freedman et al. |
| 8,073,813 | B2 | 12/2011 | Freedman |
| 8,135,769 | B2 | 3/2012 | McCarthy |

(Continued)

OTHER PUBLICATIONS

Xu, et al., "High-Accuracy TDOA-Based Localization without Time Synchronization", In Proceedings of IEEE Transactions on Parallel and Distributed Systems, vol. 24, No. 8, Aug. 2013, pp. 1567-1576.

(Continued)

*Primary Examiner* — Jau Shya Meng
(74) *Attorney, Agent, or Firm* — Fiala & Weaver P.L.L.C.

(57) ABSTRACT

Methods, systems, apparatuses, and computer program products are described herein that enable files, such as source code files used in building executable code, to be synchronized between two computing devices in a manner that utilizes file anchors or other time-stamped objects generated by and stored on each computing device. The file anchors can be used to determine which source code files on each computing device have been updated since a prior synchronization with another computing device and also to determine which version of a source code file stored on each computing device is the newer version, even when both computing devices have a different notion of time.

20 Claims, 7 Drawing Sheets

(56) References Cited

U.S. PATENT DOCUMENTS

| | | | |
|---|---|---|---|
| 8,635,186 B2 | 1/2014 | Greene et al. | |
| 8,875,038 B2 | 10/2014 | Ismalon | |
| 9,116,971 B2 | 8/2015 | Nicklin | |
| 2004/0205263 A1 | 10/2004 | Sivaraman et al. | |
| 2006/0053414 A1* | 3/2006 | Bhandari | G06F 8/74 717/133 |
| 2006/0155826 A1* | 7/2006 | Hyun | G01S 5/021 709/218 |
| 2008/0162728 A1 | 7/2008 | Robeal et al. | |
| 2009/0287726 A1* | 11/2009 | Verhoeven | G06F 16/275 |
| 2010/0228866 A1 | 9/2010 | Li et al. | |
| 2011/0087738 A1 | 4/2011 | Bartram et al. | |
| 2012/0330887 A1* | 12/2012 | Young | G06F 17/30017 707/610 |
| 2016/0379146 A1* | 12/2016 | Faulkner | G06Q 10/06311 705/7.13 |
| 2017/0033982 A1* | 2/2017 | Ruble | H04L 41/082 |

OTHER PUBLICATIONS

Eddy, "Anchor Architectural Overview", Published on: Nov. 27, 2012 Available at: https://anchorhelp.zendesk.com/entries/22490307-Anchor-Architectural-Overview.

* cited by examiner

Computing Device 1 Storage

| Filename | Timestamp |
|---|---|
| File_A | 1 |
| File_B | 2 |
| File_C | 1 |
| File_D | 3 |

Computing Device 2 Storage

| Filename | Timestamp |
|---|---|

FIG. 5A

Computing Device 1 Storage

| Filename | Timestamp |
|---|---|
| File_A | 1 |
| File_B | 2 |
| File_C | 1 |
| File_D | 3 |
| File_Anchor_1_2 | 11 |

Computing Device 2 Storage

| Filename | Timestamp |
|---|---|
| File_A | 33 |
| File_B | 33 |
| File_C | 33 |
| File_D | 33 |
| File_Anchor_2_1 | 34 |

FIG. 5B

Computing Device 1 Storage

| Filename | Timestamp |
|---|---|
| File_A | 1 |
| File_B | 17 |
| File_C | 18 |
| File_D | 19 |
| File_E | 15 |
| File_Anchor_1_2 | 11 |

Computing Device 2 Storage

| Filename | Timestamp |
|---|---|
| File_A | 33 |
| File_B | 33 |
| File_C | 45 |
| File_D | 39 |
| File_Anchor_2_1 | 34 |

FIG. 5C

SYNCHRONIZING FILES ON DIFFERENT COMPUTING DEVICES USING FILE ANCHORS

CROSS-REFERENCE TO RELATED APPLICATIONS

This application claims the benefit of U.S. Provisional Patent Application No. 62/312,201, filed on Mar. 23, 2016, the entirety of which is incorporated by reference herein.

BACKGROUND

Various types of software development applications exist that software developers may use to develop software. An integrated development environment (IDE) is a type of software development application that contains several development tools in one package. An IDE may include tools such as a source code editor, a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

In the art of software development, software may be jointly developed by different developers utilizing different computing devices. In such a distributed development environment, coordination may be required to ensure that the source code files that are being created and updated on the different computing devices are ultimately synchronized into one definitive or authoritative set of source code files.

Also, in the art of software development, source code files may be developed on one computing device and then copied to a different computing device to support a remote build. For example, source code files may be developed on a personal computer (PC) running a Microsoft® Windows® operating system and then such files may be copied to a different type of machine (e.g., an Apple® Mac® computer running IOS®, or a Raspberry Pi® computer), where they are used to build executable software. Since source code development is typically an iterative process, different versions of such source code files may be iteratively copied to the remote computing device, where they are allowed to overwrite previous versions of the same files. Furthermore, source code files may be modified on two or more different machines running different IDEs (e.g., a Microsoft® Windows® PC running Visual Studio® and an Apple® Mac® computer running Xcode®), and such files may need to be copied in any direction between such machines (e.g., from a first machine to a second machine as well as from the second machine to the first machine).

SUMMARY

Methods, systems, apparatuses, and computer program products are described herein that enable files, such as source code files used in building executable code, to be synchronized between two computing devices in a manner that utilizes file anchors or other time-stamped objects stored on each computing device. The file anchors can be used to determine which source code files on each computing device have been updated since a prior synchronization between the two computing devices and also to determine which version of a source code file stored on each computing device is the newer version, even when both computing devices have a different notion of time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiment and to enable a person skilled in the relevant art(s) to make and use the embodiments.

FIG. 5A illustrates files stored in storage of two different computing devices immediately prior to a first file synchronization between the two different computing devices.

FIG. 5B illustrates files stored in the storage of the two different computing devices of FIG. 5A after the first file synchronization.

FIG. 5C illustrates files stored in the storage of the two different computing devices of FIGS. 5A and 5B immediately prior to a second file synchronization between the two different computing devices.

Figure 1:
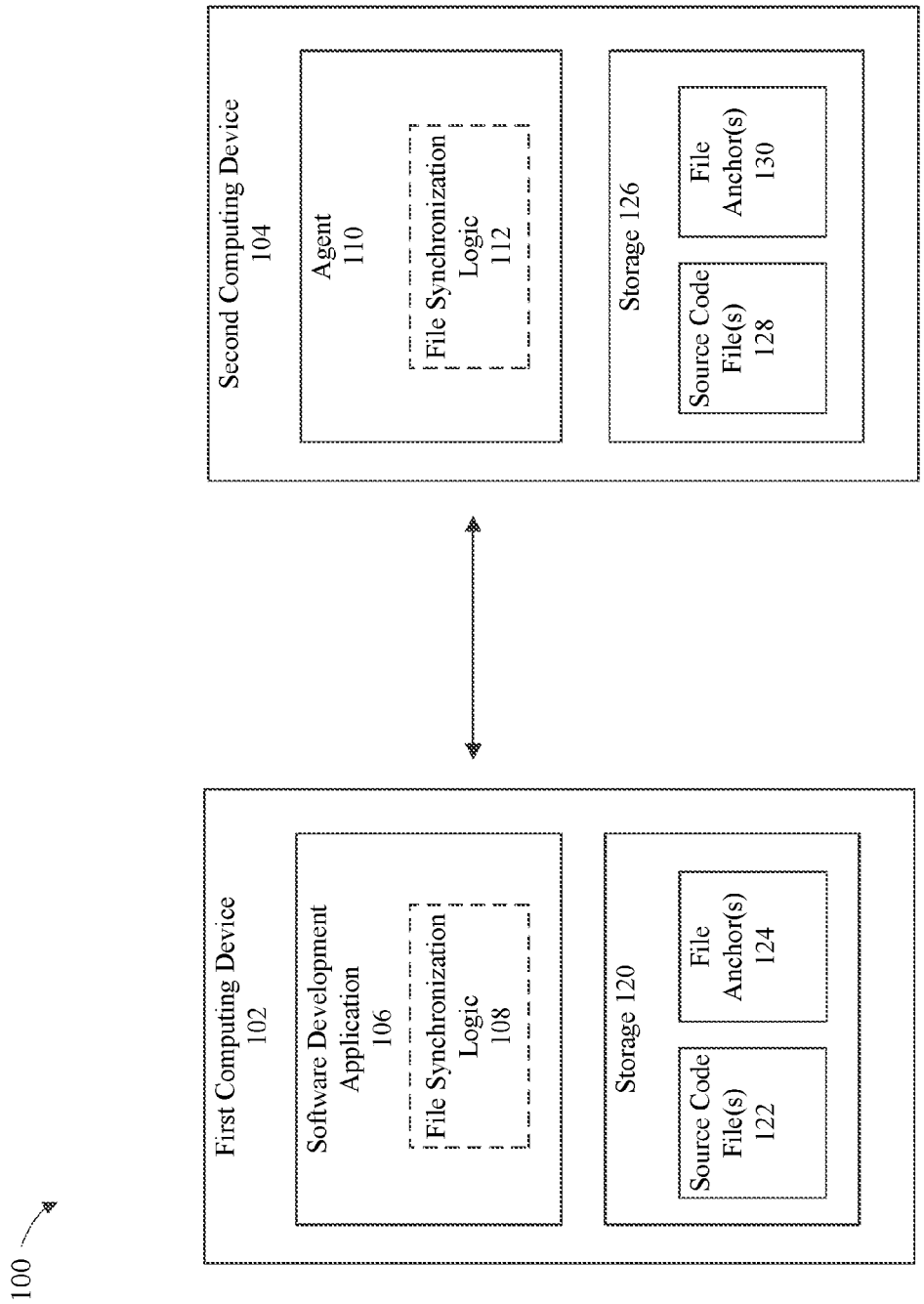
FIG. 1 is a block diagram of a software development system that utilizes file anchors to synchronize files on two different computing devices according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Synchronizing Files on Different Computing Devices Using File Anchors As noted in the background section, above, in the art of software development, software may be jointly developed by different developers utilizing different computing devices. In such a distributed development environment, coordination may be required to ensure that the source code files that are being created and updated on the different computing devices are ultimately synchronized into one definitive or authoritative set of source code files.

Also, in the art of software development, source code files may be developed on one computing device and then copied to a different computing device to support a remote build. For example, source code files may be developed on a personal computer (PC) running a Microsoft® Windows® operating system and then such files may be copied to a different type of machine (e.g., an Apple® Mac® computer running IOS®), or a Raspberry Pi® computer), where they are used to build executable software. Since source code development is typically an iterative process, different versions of such source code files may be iteratively copied to the remote computing device, where they are allowed to overwrite previous versions of the same files.

For both of the above software development scenarios, when copying source code files from a first computing device to a second computing device, it is important from an efficiency standpoint to be able to determine which source code files have actually changed since a prior synchronization between the two computing devices. This is because it is extremely inefficient in terms of both time and computing resource consumption to copy a version of a source code file from the first computing device to the second computing device when that version has already been copied to the second computer.

Also, when copying source code files from a first computing device to a second computing device, it is important to be able to tell if both the first computing device and the second computing device have a different version of the same source code file that was updated after a prior synchronization between the two computing devices. In this case, it may not be clear which version of the source code file is the desired or authoritative version, since both versions were updated after the prior synchronization. In such a scenario, user intervention may be sought in order to select the desired or authoritative source code file version, or even to merge the two versions of the source code file. An automated selection or merge may be carried out as well. In such a scenario, it is also helpful to be able to determine which of the two versions of the source code file is the newer, or more recently updated, version. For example, this information may be used to determine which version of the source code file should be kept on the second computing device.

One way to determine which of two versions of the same source code file is the newer version is to compare the timestamps that were assigned to each version of the source code file by the respective file systems on each computing device when the file was most recently updated. However, this technique will work only if each computing device that stores a version of the source code file has the exact same notion of time as the other computing device. However, for a variety of reasons, different computing devices often have different notions of time. For example, different computing devices may keep time in accordance with different time zones. As another example, different computing devices may initially have a synchronized notion of time but then experience a loss of synchronization due to a clock drift between the two computing devices, a power outage that affects one of the computing devices, or the like. One or more of the computing devices may also have an unreliable system clock. Whatever the case, if the computing devices have a different notion of time, then comparing the timestamps assigned to the different versions of the source code file will not be a reliable way to tell which version of the source code file is newer.

Embodiments described address the foregoing issues as well as other issues. In particular, embodiments described herein enable files, such as source code files used in building executable code, to be synchronized between two computing devices in a manner that utilizes file anchors stored on each computing device. As will be discussed herein, the file anchors can be used to determine which source code files on each computing device have been updated since a prior synchronization between the two computing devices and also to determine which version of a source code file stored on each computing device is the newer version.

In an embodiment, the file anchors are created on each computing device at the time of file synchronization by placing a call to a standard file system application programming interface (API) and the file anchors are assigned timestamps by the file system upon creation. As used herein, the term "timestamp" is to be broadly construed to cover any representation of a date and/or time that an event has occurred. The timestamps associated with the file anchors serve as references for determining which source code files have been modified since a prior synchronization and which have not. The timestamps associated with the file anchors also enable two computing devices having different notions of time to nevertheless determine which version of the same source code file stored on each computing device is the newer version. As will be discussed herein, this can be achieved by obtaining a difference value for each computing device, wherein the difference value is the difference between the timestamp that was assigned by the local file system to the most recent version of the source code file stored thereon and the timestamp that was assigned by the local file system to the file anchor stored thereon that was created the last time that the source code file was synchronized. These difference values can then be compared to determine which computing device is storing the newer version of the source code file. Since the difference values are divorced from each machine's local notion of time, they can be compared even when the machines have different notions of time.

These concepts will now be further described with respect to an example software development system, although the concepts discussed herein are by no means limited to this particular implementation. In particular, FIG. 1 is a block diagram of an example software development system 100 that utilizes file anchors to synchronize files, such as source code files, on two different computing devices.

As shown in FIG. 1, system 100 includes a first computing device 102 and a second computing device 104. Each of first computing device 102 and second computing device 104 may comprise any form or type of processor-based computing device, such as for example and without limitation, a desktop computer, a laptop computer, a notebook computer, a tablet computer, a smart phone, a wearable computer, an embedded computer, or the like. One example of a processor-based computer system that may be used to implement first computing device 102 or second computing device 104 will be described below in reference to FIG. 7.

As further shown in FIG. 1, first computing device 102 includes a software development application 106 and storage 120, and second computing device 104 includes an agent 110 and storage 126. Software development application 106 includes file synchronization logic 108 and/or agent 110 includes file synchronization logic 112. Storage 120 stores one or more source code files 122 and one or more file anchors 124. Storage 126 stores one or more source code files 128 and one or more file anchors 130.

Software development application 106 may be stored in a memory of first computing device 102 and executed by one or more processors thereof (not shown in FIG. 1). Agent 110 may be stored in a memory of second computing device 104 and executed by one or more processors thereof (also not shown in FIG. 1). The memory of each computing device may include non-volatile memory as well as volatile memory. The non-volatile memory may be implemented using any of a wide variety of non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives. The volatile memory may be implemented using any of a wide variety of volatile computer-readable memory devices including, but not limited to, random access memory (RAM) devices.

Storage 120 comprises a form of non-volatile memory included within or otherwise accessible to first computing device 102. Such non-volatile memory may be overlapping or non-overlapping with respect to the memory of first computing device 102 discussed in the preceding paragraph. Storage 126 comprises a form of non-volatile memory included within or otherwise accessible to second computing device 104. Such non-volatile memory may be overlapping or non-overlapping with respect to the memory of second computing device 104 discussed in the preceding paragraph.

Software development application 106 of first computing device 102 enables a user, or "developer" to develop source code (program code; software) in the form of mobile or desktop programs, applications, apps, etc. Software development application 106 may enable the user to enter and edit source code, to compile the source code, to debug the source code, etc. Software development application 106 may also enable the user to store copies of source code file(s) 122 in storage 120.

In embodiments, software development application 106 at first computing device 102 communicates with one or more agents at other computing devices, such as agent 110 at second computing device 104. Software development application 106 may communicate with agent 110 to cause a source code file synchronization to occur. Such source code file synchronization may cause one or more of source code file(s) 122 to be copied from storage 120 of first computing device 102 to storage 126 of second computing device 104, where they may be stored as source code file(s) 128 and used, for example, to support a remote build on second computing device 104. The management and execution of this file synchronization process may be carried out by file synchronization logic 108 that comprises part of software development application 106, by file synchronization logic 112 that comprises part of agent 110, or by file synchronization logic 108 operating in conjunction with file synchronization logic 112.

Note that first computing device 102 and second computing device 104 may be directly coupled by a cable or other direct link, or may include at least one network interface that enables communications over a network. Examples of applicable communication links/networks/interfaces include IEEE 802.11 wireless LAN (WLAN) wireless interface, a Worldwide Interoperability for Microwave Access (WiMAX) interface, an Ethernet interface, a Universal Serial Bus (USB) interface, a cellular network interface, a Bluetooth™ interface, a near field communication (NFC) interface, a local area network (LAN), a wide area network (WAN), a personal area network (PAN), and/or a combination of communication networks, such as the Internet. Such connection between first computing device 102 and second computing device 104 may be used to support communication there between to carry out the aforementioned source code file synchronization.

Through interaction with software development application 106, a user may cause a file synchronization to occur between first computing device 102 and second computing device 104. During this file synchronization, one or more source code files may be copied from first computing device 102 to second computing device 104, as noted above. Furthermore, during this file synchronization, a file anchor will be created by a file system on first computing device 102 and stored in storage 120 and a file anchor will also be created on second computing device 104 and stored in storage 106.

Figure 2:
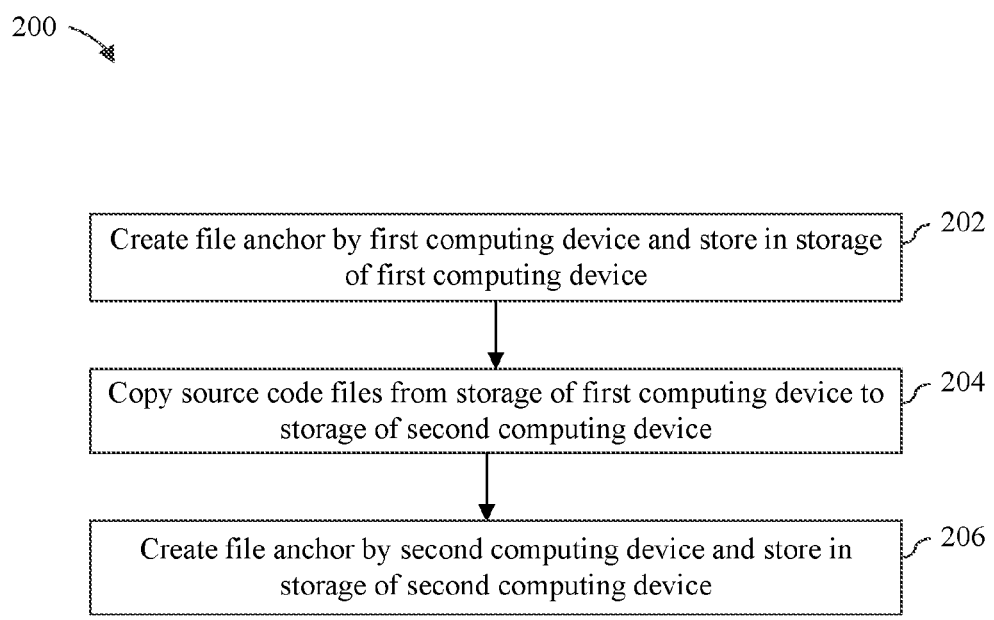
FIG. 2 depicts a flowchart of a method for generating and storing file anchors on two different computing devices during a file synchronization between the two different computing devices in accordance with an embodiment.

This process will now be described in more detail in reference to FIG. 2. In particular, FIG. 2 is a flowchart 200 of a method for generating and storing file anchors on two different computing devices during a file synchronization between the two different computing devices in accordance with an embodiment. The method of flowchart 200 will now be described with continued reference to the components of example software development system 100 of FIG. 1. However, the method is not limited to that implementation. Furthermore, although the description of flowchart 200 of FIG. 2 will refer to source code files, it will be appreciated that the method may be applied to synchronize files of any type.

As shown in FIG. 2, the method of flowchart 200 begins at step 202 in which a file anchor is created by first computing device 102 and stored in storage 120. In particular, file synchronization logic 108 and/or file synchronization logic 112 may cause an API call to be placed to a file system of first computing device 102 requesting the generation of a new file, which will be referred to herein as a file anchor. In response to receiving this request, the file system of first computing device 102 creates a new file anchor and stores it in storage 120. As part of this process, the file system assigns a timestamp to the newly-created file anchor that indicates the date and/or time that the file anchor was created. In one embodiment, file synchronization logic 108 and/or file synchronization logic 112 may also cause connection information to be provided to the file system that includes an identifier (e.g., a globally unique identifier, or GUID) of each of the two computing devices being synchronized (in this case, first computing device 102 and second computing device 104) and this information may be included as part of a name of the file anchor or included inside the file anchor (i.e., as contents of the file anchor). Thus, the timestamp assigned to the file anchor may be indicative of the date and/or time that first computing device 102 was synchronized with second computing device 102 and the name and/or contents of the file anchor may identify the machines that were synchronized at that date and/or time.

Once the file anchor has been created and stored in storage 120 of first computing device 102, then at step 204, file synchronization logic 108 and/or file synchronization logic 112 cause source code files to be copied from first computing device 102 to second computing device 104. For the purposes of this example, it will be assumed that all of the source code files to be copied from first computing device 102 to second computing device 104 are new with respect to second computing device 104. In other words, second computing device 104 initially does not store any of these source code files files. In this case, since all the files being copied over are new, they are simply copied to storage 126 of second computing device 104.

In one embodiment, file synchronization logic 108 and/or file synchronization logic 112 cause the source code files that are to be copied from first computing device 102 to second computing device 104 to be locked prior to initiating the file synchronization process (i.e., prior to step 202). This ensures that the files to be copied aren't modified after the file anchor is created and stored in accordance with step 202. In further accordance with such an embodiment, these files may not be unlocked until they have been copied to second computing device and/or the file synchronization process is deemed complete.

At step 206, after all of the source code files have been copied to storage 126 of second computing device 104, a file anchor is created by second computing device 102 and stored thereon. In particular, file synchronization logic 108 and/or file synchronization logic 112 may cause an API call to be placed to a file system of second computing device 104 requesting the generation of a new file anchor. In response to receiving this request, the file system of second computing device 104 creates a new file anchor and stores it in storage 126. As part of this process, the file system assigns a timestamp to the newly-created file anchor that indicates the date and/or time that the file anchor was created. In one embodiment, file synchronization logic 108 and/or file synchronization logic 112 may also cause connection information to be provided to the file system that includes an identifier of each of the two computing devices being synchronized (in this case, first computing device 102 and second computing device 104) and this information may be included as part of a name of the file anchor or included inside the file anchor (i.e., as contents of the file anchor).

Figure 3:
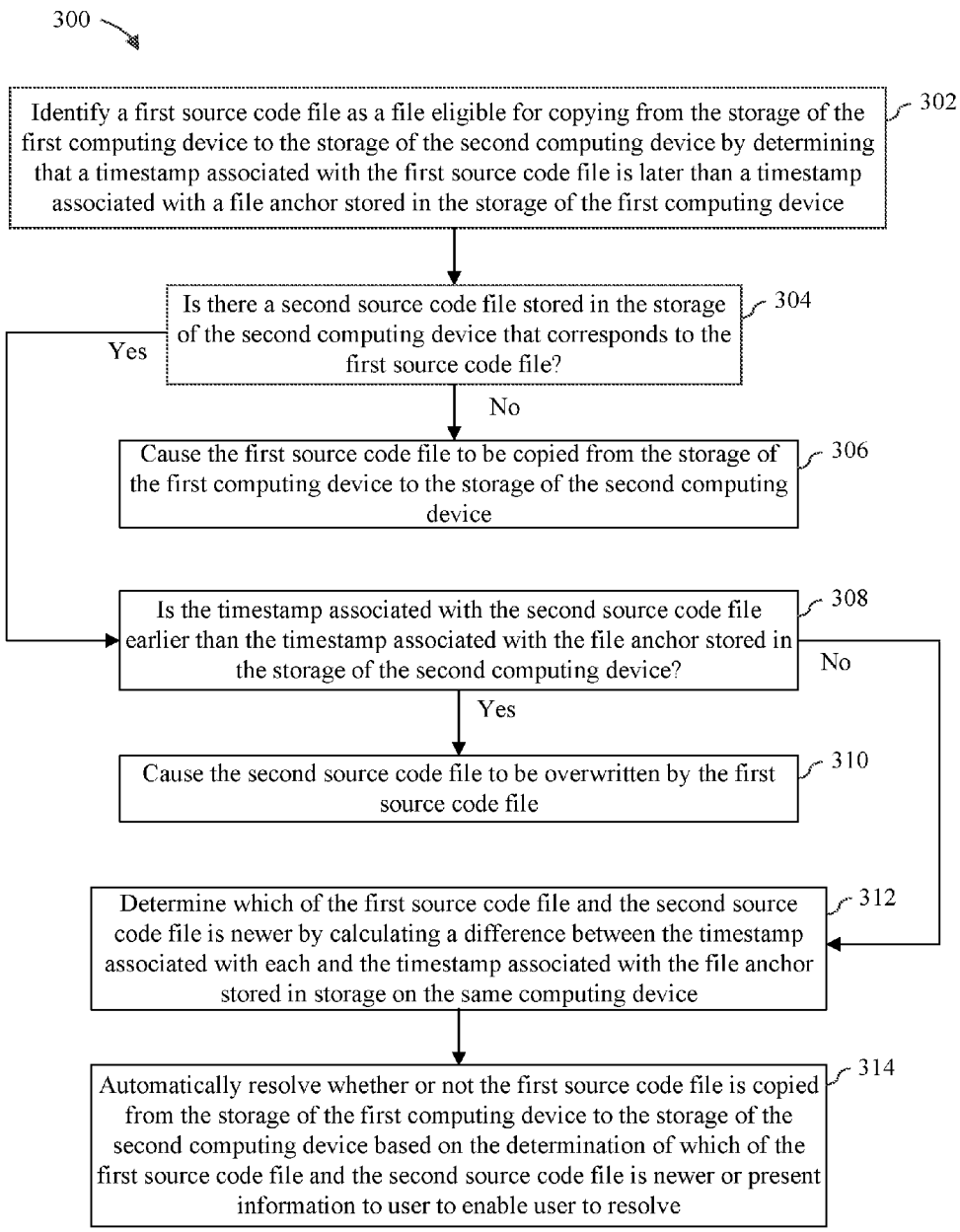
FIG. 3 depicts a flowchart of a method for managing a file synchronization between two different computing devices based on file anchors stored on each of the different computing devices in accordance with an embodiment.

The use of file anchors for file synchronization will now be further illustrated with respect to FIG. 3. In particular, FIG. 3 is a flowchart 300 of a method for managing a file synchronization between two different computing devices based on file anchors stored on each of the different computing devices. The method of flowchart 300 will now be described with continued reference to the components of example software development system 100 of FIG. 1. However, the method is not limited to that implementation. Furthermore, although the description of flowchart 300 of FIG. 3 will refer to source code files, it will be appreciated that the method may be applied to synchronize files of any type.

It is to be assumed for the purposes of the example method of flowchart 300 that first computing device 102 and second computing device 104 were previously synchronized, such that source code files were copied from first computing device 102 to second computing device 104 and such that file anchors were generated and stored on both devices in the manner discussed above in reference to flowchart 200 of FIG. 2.

As shown in FIG. 3, the method of flowchart 300 begins at step 302 in which file synchronization logic 108 and/or file synchronization logic 112 identify a first source code file that is eligible for copying from storage 120 of first computing device 102 to storage 126 of second computing device 104. This step may be performed, for example, by determining that a timestamp associated with the first source code file is later than a timestamp associated with a file anchor that is stored in storage 120 of first computing device 102. The file anchor may be the file anchor that was created and stored on first computing device 102 when first computing device 102 and second computing device 104 were previously synchronized. Since the timestamp associated with the first source code file is later than the timestamp associated with the file anchor, it can be determined that the first source code file was updated after the previous synchronization and thus should be copied over in the current synchronization. This step ensures that source code files with timestamps that are earlier than that of the file anchor do not get copied over to second computing device 104, since it is safe to assume such files were copied over as part of the previous synchronization.

At step 304, file synchronization logic 108 and/or file synchronization logic 112 determines whether there is a second source code file stored in storage 126 of second computing device 104 that corresponds to the first source code file (e.g., another version of the same source code file). For example, file synchronization logic 108 and/or file synchronization logic 112 may carry out this step by receiving or obtaining an identifier (e.g., a filename) of the first source code file and then, based on this identifier, determining if a second source code file exists in storage 126 of second computing device 104 that has the same identifier.

As shown at step 306, if there is no second source code file stored in storage 126 of second computing device 104 that corresponds to the first source code file, then file synchronization logic 108 and/or file synchronization logic 112 will cause the first source code file to be copied over from storage 120 of first computing device 102 to storage 126 of second computing device 104.

However, as shown at step 308, if there is a second source code file stored in storage 126 of second computing device 104 that corresponds to the first source code file, then file synchronization logic 108 and/or file synchronization logic 112 determines if the timestamp associated with the second source code file is earlier than the timestamp associated with a file anchor stored in storage 126 of second computing device 104. The file anchor may be the file anchor that was created and stored in storage 126 of second computing device 104 when first computing device 102 and second computing device 104 were previously synchronized.

If the timestamp associated with the second source code file is earlier than the time stamp associated with the file anchor stored in storage 126 of second computing device 104, then, as shown at step 310, file synchronization logic 108 and/or file synchronization logic 112 causes the second source code file to be overwritten by the first source code file. This overwrite occurs because the source code file version from first computing device 102 is newer than the source code file version on second computing device 104. In particular, the source code file version from first computing device 102 was updated after the previous synchronization between first computing device 102 and second computing device 104 as discussed above in reference to step 302, while the source code file version on second computing device 102 was stored prior to or as part of the previous synchronization.

However, if the timestamp associated with the second source code file is not earlier than the timestamp associated with the file anchor stored in storage 126 of second computing device 104, then the second source code file has also been updated after the previous synchronization between first computing device 102 and second computing device 104. In other words, both versions of the source code file have been updated since the previous synchronization.

In this case, control flows to step 312, in which file synchronization logic 108 and/or file synchronization logic 112 determines which of the first source code file and the second source code file is newer by calculating a difference between the timestamp associated with each source code file and the timestamp associated with the file anchor stored in storage on the same computing device. One example method for carrying out this process will be described below with respect to FIG. 4.

Depending upon the implementation, various things can now be done with this information. As shown at step 314, in the present embodiment, file synchronization logic 108 and/or file synchronization logic 112 either (a) automatically resolves whether or not the first source code file is copied from storage 120 of first computing device 102 to storage 126 of second computing device 104 based on the determination of which of the first source code file and the second source code file is newer; or (b) presents information to a user to enable the user to resolve whether or not the file is copied.

In one example in which file synchronization logic 108 and/or file synchronization logic 112 automatically resolves whether or not the first source code file is copied from storage 120 of first computing device 102 to storage 126 of second computing device 104 based on the determination of which of the first source code file and the second source code file is newer, if the first source code file is newer, then it is copied to storage 126 of second computing device 104, thereby overwriting the second source code file. However, if the second source code file is newer, then the first source code file is not copied from storage 120 of from first computing device 102 to storage 126 of second computing device 104. However, this is only an example and other methods of resolving the copy may be used.

In an embodiment in which the user is presented with information, the user may be informed which version of the source code file (i.e., the first source code file or the second source code file) is newer and then prompted to select which version of the source code file should be kept on second computing device 104. However, this is only an example and other methods of enabling the user to resolve whether or not the first source code file is copied may be used.

Figure 4:
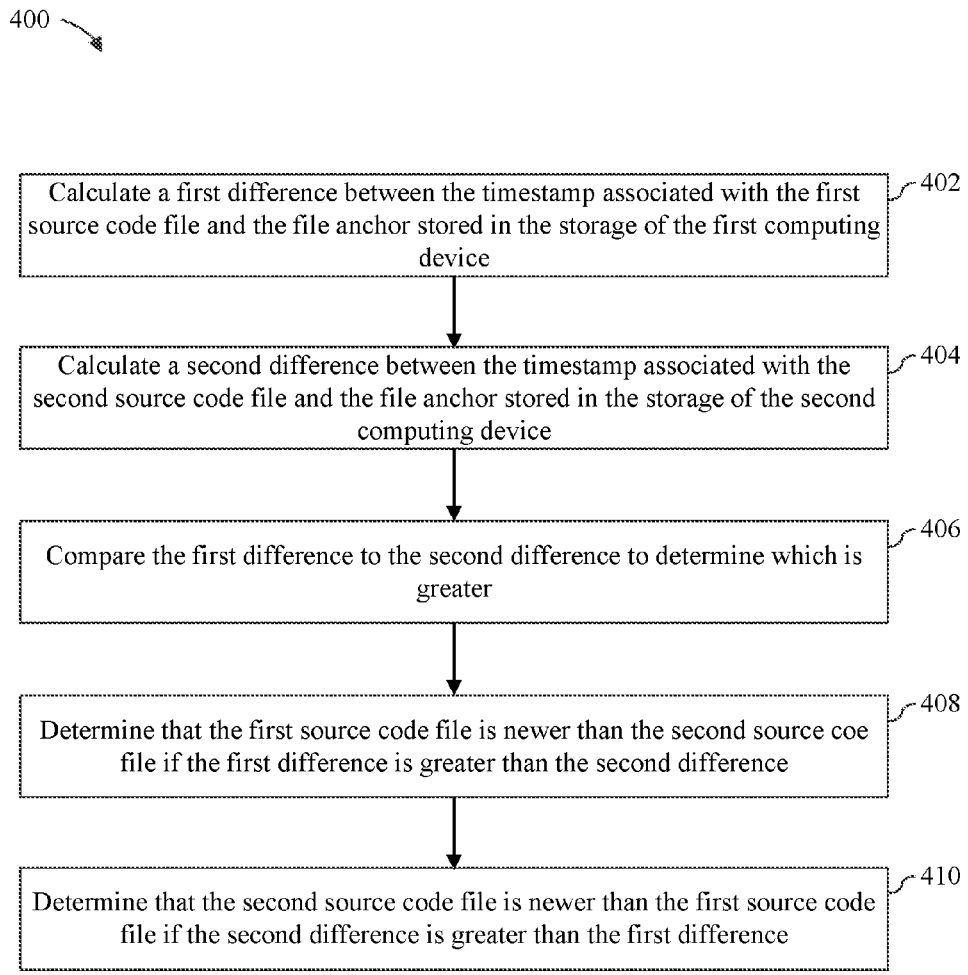
FIG. 4 depicts a flowchart of a method for determining which of two different versions of a file is the newer version based on file anchors in accordance with an embodiment.

FIG. 4 depicts a flowchart 400 of one method for determining which of two different versions of a file is the newer version based on file anchors in accordance with an embodiment. The method of flowchart 400 may be used, for example, to implement step 312 of flowchart 300 as described above in reference to FIG. 3. The method of flowchart 400 will now be described with continued reference to the components of example software development system 100 of FIG. 1. However, the method is not limited to that implementation. Furthermore, although the description of flowchart 400 of FIG. 4 will refer to source code files, it will be appreciated that the method may be applied to synchronize files of any type.

As shown in FIG. 4, the method of flowchart 400 begins at step 402, in which file synchronization logic 108 and/or file synchronization logic 112 calculates a first difference between the timestamp associated with the first source code file stored in storage 120 of first computing device 102 and the file anchor that is also stored in storage 120 of first computing device 102.

At step 404, file synchronization logic 108 and/or file synchronization logic 112 calculates a second difference between the timestamp associated with the second source code file stored in storage 126 of second computing device 104 and the file anchor that is also stored in storage 126 of second computing device 104.

At step 406, file synchronization logic 108 and/or file synchronization logic 112 compares the first difference to the second difference to determine which is greater.

At step 408, if the first difference is greater than the second difference, then file synchronization logic 108 and/or file synchronization logic 112 determines that the first source code file is newer than the second source code file.

At step 410, if the second difference is greater than the first difference, then file synchronization logic 108 and/or file synchronization logic 112 determines that the second source code file is newer than the first source code file.

To help further illustrate the foregoing file synchronization process that utilizes file anchors, a few example file synchronizations between different computing devices will now be described in reference to FIGS. 5A, 5B and 5C.

In particular, FIG. 5A shows storage of a first computing device ("computing device 1") and storage of a second computing device ("computing device 2") immediately prior to a first file synchronization being carried out between the two computing devices. Computing device 1 may be one example implementation of first computing device 102 of FIG. 1 and computing device 2 may be one example implementation of second computing device 104 of FIG. 1, or vice versa.

As shown in FIG. 5A, prior to a first file synchronization between computing device 1 and computing device 2, the storage of computing device 1 includes four source code files. The four source code files are named, respectively, "File_A", "File_B", "File_C" and "File_D". Each of the four source code files has a timestamp associated therewith. The timestamp indicates a date and/or time that each source code file was most recently modified (e.g., created or updated). Such timestamp may be assigned to each source code by a file system of computing device 1 when the source code file is created or saved. In the example of FIG. 5, the timestamp associated with File_A is "1", which indicates that File_A was most recently modified at time 1. As further shown in FIG. 5, File_B has a timestamp of "2", File_C has a timestamp of "1" and File_D has a timestamp of "3". The timestamps assigned to these source code files by the file system of computing device 1 reflect a local notion of time tracked by computing device 1. These timestamps are shown as simple integers for the purpose of this example. Persons skilled in the relevant art(s) will appreciate that timestamps may take on many different forms and include different types of date and time-related information.

As further shown in FIG. 5A, no source code files are currently stored in the storage of computing device 2.

FIG. 5B shows the storage of computing device 1 and the storage of computing device 2 after the first file synchronization has been carried out between the two computing devices. As shown in FIG. 5B, as part of the first file synchronization, a file anchor named "File_Anchor_1_2" was created and stored in the storage of computing device 1. This file anchor "File_Anchor_1_2" was created at time 11 as measured by computing device 1, as indicated by the timestamp assigned thereto, and was created prior to the copying of the four source code files from computing device 1 to computing device 2. The filename "File_Anchor_1_2" includes an identifier of computing device 1 (i.e., the name or identifier (ID) "1") and an identifier of computing device 2 (i.e., the name or ID "2"). Thus, the filename "File_Anchor_1_2" indicates that the file anchor was created during a prior synchronization between computing device 1 and computing device 2.

As also shown in FIG. 5B, during the first file synchronization, the four source code files stored in storage of computing device 1 were copied to the storage of computing device 2. Thus, the storage of computing device 2 now includes a copy of each of these files, also named File_A, File_B, File_C and File_D. A file system of computing device 2 has assigned a timestamp of "33" to each of these files, which indicates when each of these files was created by the file system and reflects a local notion of time tracked by computing device 2. This notion of time is different than that maintained by computing device 1. Computing device 1 and computing device 2 may have different notions of time, for example, for reasons that were previously discussed.

As still further shown in FIG. 5B, during the first file synchronization, a file anchor named "File_Anchor_2_1" was created and stored in the storage of computing device 2. This file anchor "File_Anchor_2_1" was created at time 34 as measured by computing device 2, as indicated by the timestamp assigned thereto, and was created after the copying of the four source code files from computing device 1 to computing device 2. The filename "File_Anchor_2_1" includes an identifier of computing device 2 (i.e., the name or ID "2") and an identifier of computing device 1 (i.e., the name or ID "1"). Thus, the filename "File_Anchor_2_1" indicates that the file anchor was created during a prior synchronization between computing device 2 and computing device 1.

FIG. 5C illustrates files stored in the storage of computing device 1 and the storage of computing device 2 at some time after the first file synchronization discussed above and immediately prior to a second file synchronization between computing device 1 and computing device 2. As shown in FIG. 5C, since the first file synchronization, File_B, File_C and File_D in the storage of computing device 1 have been modified and thus have been assigned new timestamps that are later than the timestamp assigned to file anchor "File_Anchor_1_2". Furthermore, since the first file synchronization, a new source code file named "File_E" has been created in the storage of computing device 1 and has been assigned a timestamp that is later than the timestamp assigned to file anchor "File_Anchor_1_2". As also shown in FIG. 5C, since the first file synchronization, File_C and File_D in the storage of computing device 2 have been modified and thus have been assigned new timestamps that are later than the timestamp assigned to file anchor "File_Anchor_2_1." The manner in which the second file synchronization may be carried out given these starting conditions will now be described.

As part of the second file synchronization, a determination is first made as to which source code files stored in the storage of computing device 1 are eligible for copying to the storage of computing device 2. In accordance with this example, the timestamp associated with each of the source code files in the storage of computing device 1 is compared to the timestamp associated with "File_Anchor_1_2". Only those source code files that have a timestamp associated therewith that is later than the timestamp associated with "File_Anchor_1_2" are deemed eligible for copying. Thus, in this case only File_B, File_C, File_D and File_E are deemed eligible for copying. There is no need to copy File_A since that file was copied to computing device 2 in the first file synchronization. How each of File_B, File_C, File_D and File_E are handled during the second file synchronization process will now be described.

For File_B, a determination is made as to whether another version of this file exists in the storage on computing device 2. In this case, another version of this file does in fact exist in the storage on computing device 2. Since this is the case, it is then determined whether the timestamp associated with File_B on computing device 2 is earlier than the timestamp associated with "File_Anchor_2_1". In this case, the timestamp associated with File_B on computing device 2 is in fact earlier than the timestamp associated with "File_Anchor_2_1". This means that File_B has not been modified on computing device 2 since the last file synchronization with computing device 1. Since this is the case, File_B will be copied from the storage of computing device 1 to the storage of computing device 2, thereby overwriting the version of File_B on computing device 2 with the newer version of File_B from computing device 1.

For File_C, a determination is made as to whether another version of this file exists in the storage on computing device 2. In this case, another version of this file does in fact exist in the storage on computing device 2. Since this is the case, it is then determined whether the timestamp associated with File_C on computing device 2 is earlier than the timestamp associated with "File_Anchor_2_1". In this case, the timestamp associated with File_C on computing device 2 is not earlier than the timestamp associated with "File_Anchor_2_1". This means that File_C has been modified on computing device 2 since the last file synchronization with computing device 1. Since this is the case, a determination is made as to which version of File_C is newer—the version stored in storage of computing device 1 or the version stored in storage of computing device 2.

As discussed above, this determination can be made as follows. First, a first difference between the timestamp associated with File_C on computing device 1 and the timestamp associated with "File_Anchor_1_2" is determined, which in this case is 18–11, or 7. A second difference between the timestamp associated with File_C on computing device 2 and the timestamp associated with "File_Anchor_2_1" is also determined, which in this case is 45–34, or 9. Since the second difference is greater than the first difference, it is determined that the version of File_C stored in the storage of computing device 2 is actually newer than the version of File_C stored in the storage of computing device 1. As can be seen, this determination can be made even though computing device 1 and computing device 2 each have a different notion of time.

Based on this information, the copying of File_C from computing device 1 to computing device 2 may be automatically prevented so as to preserve the newer version of the file on computing device 2. Alternatively, a user may be presented with information (e.g., via a dialog box or other user interface element) that indicates that the version of File_C on computing device 2 is newer than the version of File_C on computing device 1 and then prompted to select whether or not File_C should be copied from the storage of computing device 1 to the storage of computing device 2 in view of this information. In this case, whether or not the copy occurs will be determined by the user's selection.

For File_D, a determination is made as to whether another version of this file exists in the storage on computing device 2. In this case, another version of this file does in fact exist in the storage on computing device 2. Since this is the case, it is then determined whether the timestamp associated with File_D on computing device 2 is earlier than the timestamp associated with "File_Anchor_2_1". In this case, the timestamp associated with File_D on computing device 2 is not earlier than the timestamp associated with "File_Anchor_2_1". This means that File_D has been modified on computing device 2 since the last file synchronization with computing device 1. Since this is the case, a determination is made as to which version of File_D is newer—the version stored in storage of computing device 1 or the version stored in storage of computing device 2.

As discussed above, this determination can be made as follows. First, a first difference between the timestamp associated with File_D on computing device 1 and the timestamp associated with "File_Anchor_1_2" is determined, which in this case is 19–11, or 8. A second difference between the timestamp associated with File_D on computing device 2 and the timestamp associated with "File_Anchor_2_1" is also determined, which in this case is 39–34, or 5. Since the first difference is greater than the second difference, it is determined that the version of File_D stored in the storage of computing device 1 is actually newer than the version of File_D stored in the storage of computing device 2. As can be seen, this determination can be made even though computing device 1 and computing device 2 each have a different notion of time.

Based on this information, the copying of File_D from computing device 1 to computing device 2 may be automatically carried out since the version of File_D on computing device 1 is the newer version. Alternatively, a user may be presented with information (e.g., via a dialog box or other user interface element) that indicates that the version of File_D on computing device 1 is newer than the version of File_D on computing device 2 but that the version of File_D on computing device 2 has been modified since the last file synchronization between computing device 1 and computing device 2. The user may also be prompted to select whether or not File_D should be copied from the storage of computing device 1 to the storage of computing device 2 in view of this information. Once again, whether or not the copy occurs will be determined by the user's selection.

In further embodiments, when it is determined that both versions of the same source code file have been modified since a prior file synchronization between computing device 1 and computing device 2, the user may be given other options, such as an option to merge the different versions of the source code file, to obtain a representation of the differences between the different versions of the source code file, or the like.

For File_E, a determination is made as to whether another version of this file exists in the storage on computing device 2. In this case, another version of this file does not exist in the storage on computing device 2. Since this is the case, File_E will be copied from the storage of computing device 1 to the storage of computing device 2.

It is noted that the foregoing techniques can advantageously be used to copy files in either or both directions between two different computing devices—these techniques are by no means limited to unidirectional file copies. For example, with reference to system 100 of FIG. 1, the foregoing techniques may be used to copy files from first computing device 102 to second computing device 104 as well as from second computing device 104 to first computing device 102. Furthermore, with reference to FIGS. 5A, 5B and 5C, the foregoing techniques may be used to copy files from computing device 1 to computing device 2 as well as from computing device 2 to computing device 1.

Furthermore, the foregoing techniques can be applied in a scenario in which multiple different computing devices conduct file synchronization with a common computing device. Each file synchronization pairing will result in the generation of a file anchor on the common computing device that indicates when and with what other machine synchronization occurred. Using the foregoing techniques, it is possible when synchronizing files between a first computing device and the common computing device that the user can be informed that since the last synchronization between the first computing device and the common computing device, another computing device (e.g., a second computing device) synchronized with the common computing device. The user may utilize this knowledge to selectively resolve conflicts between competing versions of the same source code files.

Figure 6:
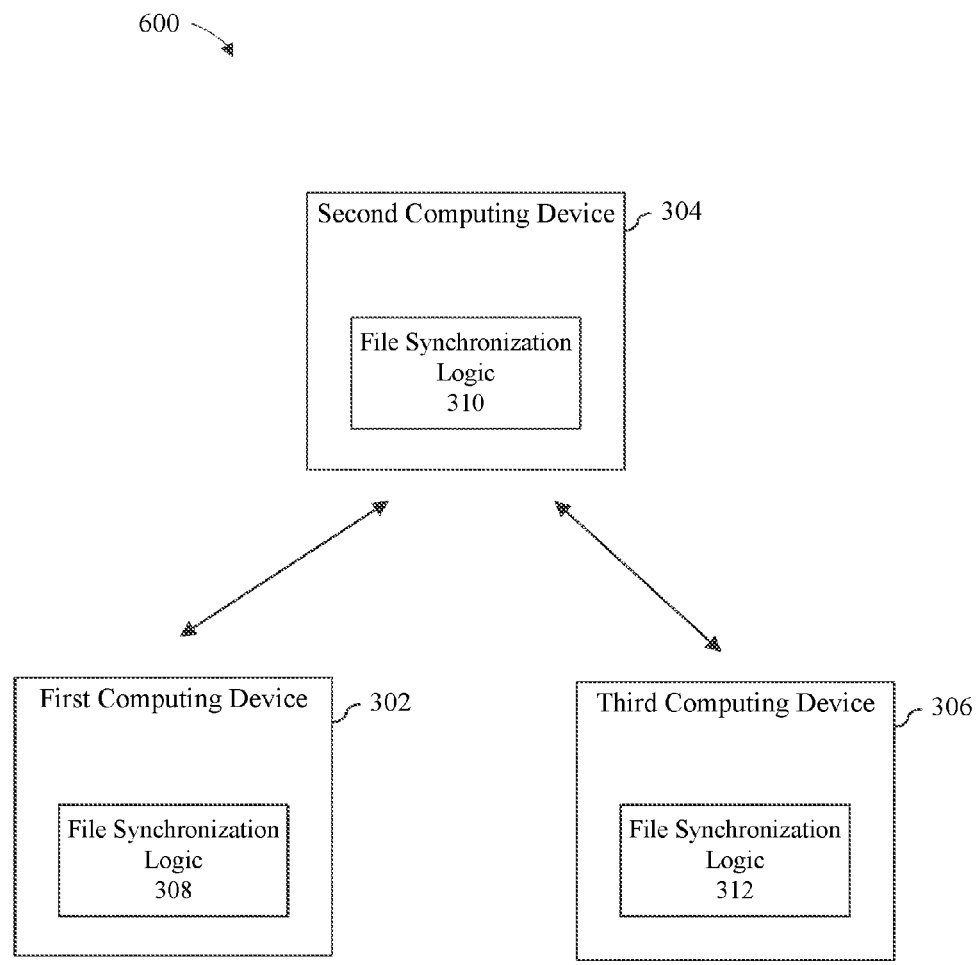
FIG. 6 is a block diagram of a further software development system that utilizes file anchors to synchronize files on three or more computing devices according to an example embodiment.

Such a scenario will now be described in reference to FIG. 6. In particular, FIG. 6 is a block diagram of a software development system 600 that utilizes file anchors to synchronize files on three or more computing devices according to an example embodiment.

System 600 includes a first computing device 302 that includes file synchronization logic 308, a second computing device 304 that includes file synchronization logic 310, and a third computing device 306 that includes file synchronization logic 312. Via utilization of their respective file synchronization logic, first computing device 302 is capable of conducting a file synchronization process with second computing device 304. Furthermore, via utilization of their respective file synchronization logic, third computing device 306 is also capable of conducting a file synchronization process with second computing device 304.

Each file synchronization between first computing device 302 and second computing device 304 will result in the generation of a file anchor on first computing device 302 and second computing device 304 that indicates when the file synchronization occurred and between what computing devices. Likewise, each file synchronization between third computing device 306 and second computing device 304 will result in the generation of a file anchor on first computing device 302 and second computing device 304 that indicates when the file synchronization occurred and between what computing devices. By using the foregoing techniques, it is possible when synchronizing files between, for example, first computing device 302 and second computing device 304, that the user can be informed that since the last synchronization between first computing device 302 and second computing device 304, computing device 306 synchronized with second computing device 304. The user may utilize this knowledge to selectively resolve conflicts between competing versions of the same source code files.

It is also noted that the foregoing techniques are not limited to file anchors only. Rather any artifact or entity that can be generated by a computing device and assigned a timestamp may serve a similar purpose to the file anchors described above. Thus, for example, file folders, database entries, e-mail messages, or the like, may be used as the time-stamped objects that facilitate the above-described techniques.

III. Example Computer System Implementation

Figure 7:
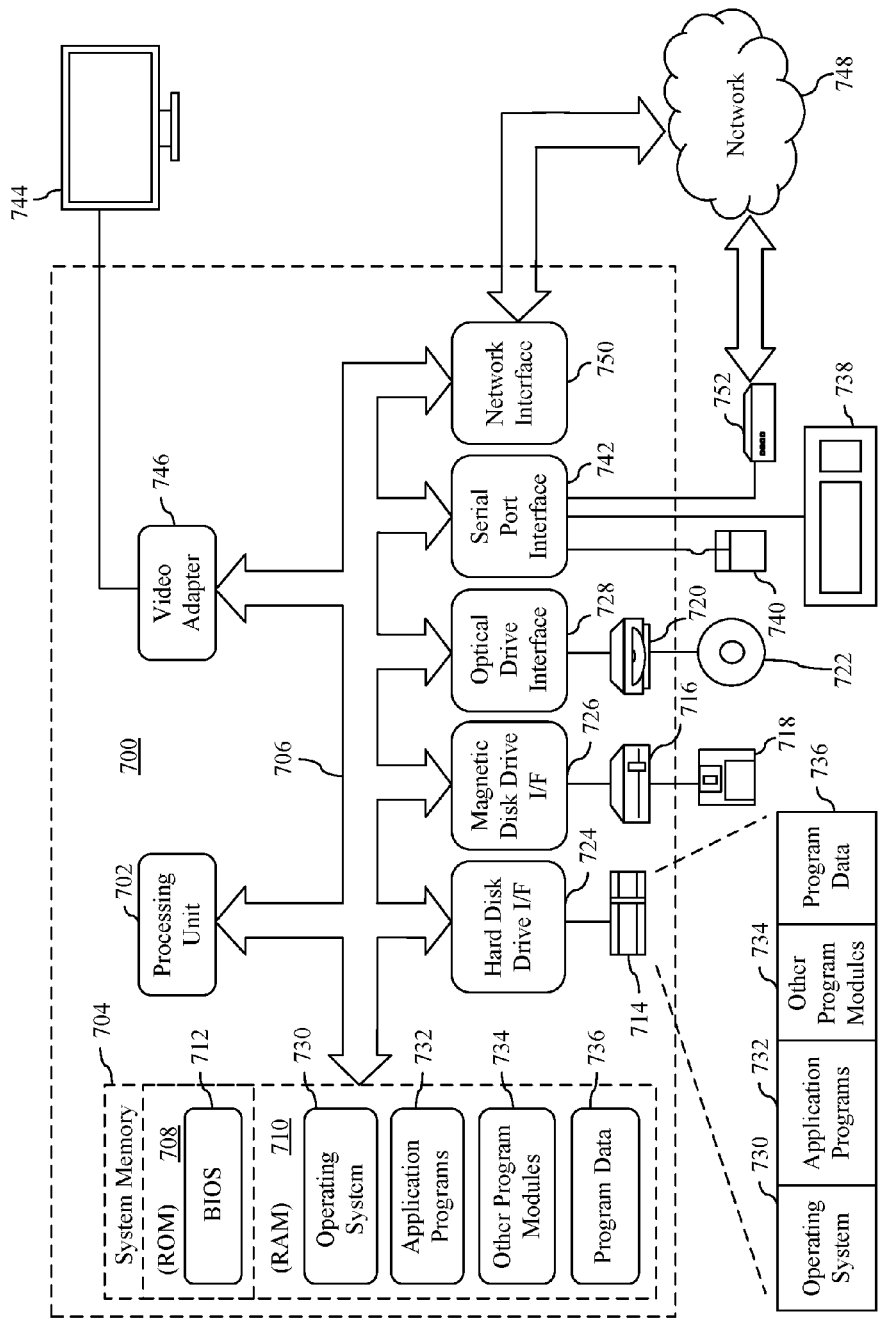
FIG. 7 is a block diagram of an example processor-based computer system that may be used to implement various embodiments.

FIG. 7 depicts an example processor-based computer system 700 that may be used to implement various embodiments described herein. For example, system 700 may be used to implement first computing device 102, second computing device 104 and/or third computing device 302 as described above in reference to FIGS. 1 and 3. System 700 may also be used to implement any or all of the steps of any or all of the flowcharts depicted in FIGS. 2-4. The description of system 700 provided herein is provided for purposes of illustration, and is not intended to be limiting. Embodiments may be implemented in further types of computer systems, as would be known to persons skilled in the relevant art(s).

As shown in FIG. 7, system 700 includes a processing unit 702, a system memory 704, and a bus 706 that couples various system components including system memory 704 to processing unit 702. Processing unit 702 may comprise one or more microprocessors or microprocessor cores. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

System 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, BLU-RAY™ disk or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 730, one or more application programs 732, other program modules 734, and program data 736. In accordance with various embodiments, the program modules may include computer program logic that is executable by processing unit 702 to perform any or all of the functions and features of first computing device 102, second computing device 104 and/or third computing device 302 as described above in reference to FIGS. 1-3. The program modules may also include computer program logic that, when executed by processing unit 402, performs any of the steps or operations shown or described in reference to the flowcharts of FIGS. 2-4.

A user may enter commands and information into system 700 through input devices such as a keyboard 738 and a pointing device 740 (e.g., a mouse). Other input devices (not shown) may include a microphone, joystick, game controller, scanner, or the like. In one embodiment, a touch screen is provided in conjunction with a display 744 to allow a user to provide user input via the application of a touch (as by a finger or stylus for example) to one or more points on the touch screen. These and other input devices are often connected to processing unit 702 through a serial port interface 742 that is coupled to bus 706, but may be connected by other interfaces, such as a parallel port, game port, or a universal serial bus (USB). Such interfaces may be wired or wireless interfaces.

Display 744 is connected to bus 706 via an interface, such as a video adapter 746. In addition to display 744, system 700 may include other peripheral output devices (not shown) such as speakers and printers.

System 700 is connected to a network 748 (e.g., a local area network or wide area network such as the Internet) through a network interface 750, a modem 752, or other suitable means for establishing communications over the network. Modem 752, which may be internal or external, is connected to bus 806 via serial port interface 742.

As used herein, the terms "computer program medium," "computer-readable medium," and "computer-readable storage medium" are used to generally refer to memory devices or storage structures such as the hard disk associated with hard disk drive 714, removable magnetic disk 718, removable optical disk 722, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750, serial port interface 742, or any other interface type. Such computer programs, when executed or loaded by an application, enable system 700 to implement features of embodiments discussed herein. Accordingly, such computer programs represent controllers of the system 700.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 700 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Additional Embodiments

A computer-implemented method for carrying out a file synchronization between a first computing device and a second computing device is described herein. In accordance with the method, an identifier of a first file that is eligible for copying from storage of the first computing device to storage of the second computing device is received. Based on the identifier, it is determined if there is a second file stored in the storage of the second computing device that corresponds to the first file. In response to determining that there is a second file stored in the storage of the second computing device that corresponds to the first file, it is determined if a timestamp associated with the second file is earlier than a timestamp associated with a file anchor stored in the storage of the second computing device. In response to determining that the timestamp associated with the second file is earlier than the timestamp associated with the file anchor stored in the storage of the second computing device, the second file is overwritten by the first file.

In one embodiment of the foregoing method, the file anchor stored in the storage of the second computing device comprises a file that was created during a previous file synchronization between the first computing device and the second computing device.

In another embodiment of the foregoing method, the file anchor stored in the storage of the second computing device comprises a file that was created during a previous file synchronization between the second computing device and a third computing device.

In still another embodiment of the foregoing method, the method further includes identifying the first file as a file to be copied from the storage of the first computing device to the storage of the second computing device by determining that a timestamp associated with the first file is later than a timestamp associated with a file anchor stored in the storage of the first computing device.

In yet another embodiment of the foregoing method, the method further includes, in response to determining that the timestamp associated with the second file is not earlier than the timestamp associated with the file anchor stored in the storage of the second computing device, determining which of the first file and the second file is newer by: calculating a first difference between the timestamp associated with the first file and a file anchor stored in the storage of the first computing device; calculating a second difference between the timestamp associated with the second file and the file anchor stored in the storage of the second computing device; comparing the first difference to the second difference; determining that the first file is newer than the second file if the first difference is greater than the second difference; and determining that the second file is newer than the first file if the second difference is greater than the first difference.

In a further embodiment of the foregoing method, the method further includes automatically resolving whether or not to copy the first file from the storage of the first computing device to the storage of the second computing device based on the determination of which of the first file and the second file is newer.

In a still further embodiment of the foregoing method, the method further includes presenting information to a user to assist the user in resolving whether or not to copy the first file from the storage of the first computing device to the storage of the second computing device, the information including the determination of which of the first file and the second file is newer.

In another embodiment of the foregoing method, the method further includes identifying the file anchor stored in the storage of the second computing device by determining that a name associated with the file anchor stored in the storage of the second computing device includes at least an identifier of the first computing device or of a computer program installed thereon.

In yet another embodiment of the foregoing method, the method further includes identifying the file stored in the storage of the second computing device by determining that contents of the file anchor stored in the storage of the second computing device includes at least an identifier of the first computing device or of a computer program installed thereon.

A first computing device is also described herein. The first computing device includes one or more processors and memory that is connected to the one or more processors and stores computer program logic for execution thereby. The computer program logic includes file synchronization logic. The file synchronization logic is configured to perform a file synchronization between the first computing device and a second computing device that is communicatively connected thereto. Performing the file synchronization includes identifying a first file stored in storage of the first computing device as eligible for copying to storage of the second computing device. The identifying includes determining that a timestamp associated with the first file stored in the storage of the first computing device is later than a timestamp associated with a file anchor stored in the storage of the first computing device.

In one embodiment of the foregoing first computing device, the file anchor stored in the storage of the first computing device comprises a file that was created during a previous file synchronization between the first computing device and the second computing device.

In another embodiment of the foregoing first computing device, the file anchor stored in the storage of the first computing device comprises a file that was created during a previous file synchronization between the first computing device and a third computing device.

In yet another embodiment of the foregoing first computing device, the file synchronization logic is further configured to: determine whether there is a second file stored in the storage of the second computing device that corresponds to the first file; in response to determining that there is a second file stored in the storage of the second computing device that corresponds to the first file, determine whether a timestamp associated with the second file is not earlier than a timestamp associated with a file anchor stored in the storage of the second computing device; and in response to determining that the timestamp associated with the second file is not earlier than the timestamp associated with a file anchor stored in the storage of the second computing device, determine which of the first file and the second file is newer by: calculating a first difference between the timestamp associated with the first file and a file anchor stored in the storage of the first computing device; calculating a second difference between the timestamp associated with the second file and the file anchor stored in the storage of the second computing device; comparing the first difference to the second difference; determining that the first file is newer than the second file if the first difference is greater than the second difference; and determining that the second file is newer than the first file if the second difference is greater than the first difference.

In still another embodiment of the first computing device, the file synchronization logic is further configured to automatically resolve whether or not to copy the first file from the storage of the first computing device to the storage of the second computing device based on the determination of which of the first file and the second file is newer.

In a further embodiment of the first computing device, the file synchronization logic is further configured to present information to a user to assist the user in resolving whether or not to copy the first file from the storage of the first computing device to the storage of the second computing device, the information including the determination of which of the first file and the second file is newer.

In a still further embodiment of the first computing device, the file synchronization logic is further configured to identify the file anchor stored in the storage of the first computing device by determining that a name associated with the file anchor stored in the storage of the first computing device includes at least an identifier of the second computing device or of a computer program installed thereon.

In another embodiment of the first computing device, the file synchronization logic is further configured to identify the file anchor stored in the storage of the first computing device by determining that contents of the file anchor stored in the storage of the first computing device includes at least an identifier of the second computing device or of a computer program installed thereon.

A computer program product is also described herein. The computer program product comprises a computer-readable memory having computer program logic recorded thereon that when executed by at least one processor causes the at least one processor to perform a method. The method includes: receiving an identifier of a first file that is eligible for copying from storage of a first computing device to storage of a second computing device; determining, based on the identifier, if there is a second file stored in the storage of the second computing device that corresponds to the first file; in response to determining that there is a second file stored in the storage of the second computing device that corresponds to the first file, determining if a timestamp associated with the second file is earlier than a timestamp associated with an object stored in the storage of the second computing device; and in response to determining that the timestamp associated with the second file is earlier than the timestamp associated with the object stored in the storage of the second computing device, causing the second file to be overwritten by the first file.

In one embodiment of the foregoing computer program product of claim 18, the object stored in the storage of the second computing device comprises one of a file system object, a database object, or a message.

In another embodiment of the foregoing computer program product, the object stored in the storage of the second computing device comprises a file that was created during a previous file synchronization between the first computing device and the second computing device.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-implemented method for carrying out a file synchronization between a first computing device and a second computing device, comprising:
receiving an identifier of a first file that is eligible for copying from storage of the first computing device to storage of the second computing device;
determining, based on the identifier, if there is a second file stored in the storage of the second computing device that corresponds to the first file;
in response to determining that there is a second file stored in the storage of the second computing device that corresponds to the first file, determining if a timestamp associated with the second file is earlier than a timestamp associated with a file anchor stored in the storage of the second computing device, the file anchor comprising a file that was created by the second computing device during a previous file synchronization between the second computing device and another computing device and the timestamp associated with the file anchor being assigned to the file anchor by the second computing device upon creation of the file anchor; and
in response to determining that the timestamp associated with the second file is earlier than the timestamp associated with the file anchor stored in the storage of the second computing device, causing the second file to be overwritten by the first file.

2. The method of claim 1, wherein the other computing device comprises the second computing device.

3. The method of claim 1, wherein the other computing device comprises a third computing device.

4. The method of claim 1, further comprising:
identifying the first file as a file to be copied from the storage of the first computing device to the storage of the second computing device by determining that a timestamp associated with the first file is later than a timestamp associated with a file anchor stored in the storage of the first computing device.

5. The method of claim 1, further comprising:
in response to determining that the timestamp associated with the second file is not earlier than the timestamp associated with the file anchor stored in the storage of the second computing device, determining which of the first file and the second file is newer by:
calculating a first difference between the timestamp associated with the first file and a file anchor stored in the storage of the first computing device;
calculating a second difference between the timestamp associated with the second file and the file anchor stored in the storage of the second computing device;
comparing the first difference to the second difference;
determining that the first file is newer than the second file if the first difference is greater than the second difference; and
determining that the second file is newer than the first file if the second difference is greater than the first difference.

6. The method of claim 5, further comprising automatically resolving whether or not to copy the first file from the storage of the first computing device to the storage of the second computing device based on the determination of which of the first file and the second file is newer.

7. The method of claim 5, further comprising presenting information to a user to assist the user in resolving whether or not to copy the first file from the storage of the first computing device to the storage of the second computing device, the information including the determination of which of the first file and the second file is newer.

8. The method of claim 1, further comprising:
identifying the file anchor stored in the storage of the second computing device by determining that a name associated with the file anchor stored in the storage of the second computing device includes at least an identifier of the first computing device or of a computer program installed thereon.

9. The method of claim 1, further comprising:
identifying the file stored in the storage of the second computing device by determining that contents of the file anchor stored in the storage of the second computing device includes at least an identifier of the first computing device or of a computer program installed thereon.

10. A first computing device, comprising:
one or more processors; and
memory that is connected to the one or more processors and stores computer program logic for execution thereby, the computer program logic including:
file synchronization logic that is configured to perform a file synchronization between the first computing device and a second computing device that is communicatively connected thereto, performing the file synchronization including identifying a first file stored in storage of the first computing device as eligible for copying to storage of the second computing device, the identifying including determining that a timestamp associated with the first file stored in the storage of the first computing device is later than a timestamp associated with a file anchor stored in the storage of the first computing device, the file anchor comprising a file that was created by the first computing device during a previous file synchronization between the first computing device and another computing device and the timestamp associated with the file anchor being assigned to the file anchor by the first computing device upon creation of the file anchor.

11. The first computing device of claim 10, wherein the other computing device comprises the second computing device.

12. The first computing device of claim 10, wherein the other computing device comprises a third computing device.

13. The first computing device of claim 10, wherein the file synchronization logic is further configured to:
determine whether there is a second file stored in the storage of the second computing device that corresponds to the first file;
in response to determining that there is a second file stored in the storage of the second computing device that corresponds to the first file, determine whether a timestamp associated with the second file is not earlier than a timestamp associated with a file anchor stored in the storage of the second computing device; and
in response to determining that the timestamp associated with the second file is not earlier than the timestamp associated with a file anchor stored in the storage of the second computing device, determine which of the first file and the second file is newer by:
calculating a first difference between the timestamp associated with the first file and a file anchor stored in the storage of the first computing device;
calculating a second difference between the timestamp associated with the second file and the file anchor stored in the storage of the second computing device;
comparing the first difference to the second difference;
determining that the first file is newer than the second file if the first difference is greater than the second difference; and
determining that the second file is newer than the first file if the second difference is greater than the first difference.

14. The first computing device of claim 13, wherein the file synchronization logic is further configured to automatically resolve whether or not to copy the first file from the storage of the first computing device to the storage of the second computing device based on the determination of which of the first file and the second file is newer.

15. The first computing device of claim 13, wherein the file synchronization logic is further configured to present information to a user to assist the user in resolving whether or not to copy the first file from the storage of the first computing device to the storage of the second computing device, the information including the determination of which of the first file and the second file is newer.

16. The first computing device of claim 10, wherein the file synchronization logic is further configured to identify the file anchor stored in the storage of the first computing device by determining that a name associated with the file anchor stored in the storage of the first computing device includes at least an identifier of the second computing device or of a computer program installed thereon.

17. The first computing device of claim 10, wherein the file synchronization logic is further configured to identify the file anchor stored in the storage of the first computing device by determining that contents of the file anchor stored in the storage of the first computing device includes at least an identifier of the second computing device or of a computer program installed thereon.

18. A computer program product comprising a computer-readable storage media having computer program logic recorded thereon that when executed by at least one processor causes the at least one processor to perform a method comprising:

receiving an identifier of a first file that is eligible for copying from storage of a first computing device to storage of a second computing device;

determining, based on the identifier, if there is a second file stored in the storage of the second computing device that corresponds to the first file;

in response to determining that there is a second file stored in the storage of the second computing device that corresponds to the first file, determining if a timestamp associated with the second file is earlier than a timestamp associated with an object stored in the storage of the second computing device, the object comprising one of a file, a database entry or an email message that was created by the second computing device during a previous file synchronization between the second computing device and another computing device and the timestamp associated with the object being assigned to the object by the second computing device upon creation of the object; and in response to determining that the timestamp associated with the second file is earlier than the timestamp associated with the object stored in the storage of the second computing device, causing the second file to be overwritten by the first file.

19. The computer program product of claim 18, wherein the other computing device comprises the second computing device.

20. The computer program product of claim 18, wherein the other computing device comprises a third computing device.

\* \* \* \* \*